United States Patent [19]
White et al.

[11] Patent Number: 5,322,415
[45] Date of Patent: Jun. 21, 1994

[54] PITCH ACTUATION SYSTEM RESTRAINT DEVICE FOR A HELICOPTER BLADE FOLDING SYSTEM

[75] Inventors: Kevin A. White, Shelton; John H. Engelmann, Jr., Cheshire, both of Conn.

[73] Assignee: United Technologies Corporation, Hartford, Conn.

[21] Appl. No.: 977,996

[22] Filed: Nov. 18, 1992

[51] Int. Cl.$^5$ ............................................. B64C 11/28
[52] U.S. Cl. ................................. 416/143; 416/142
[58] Field of Search ............................... 416/142, 143

[56] References Cited

U.S. PATENT DOCUMENTS

| | | | |
|---|---|---|---|
| 2,950,767 | 8/1960 | Lemont, Jr. | 416/143 |
| 3,125,164 | 3/1964 | Merrell | 416/143 |
| 3,187,818 | 6/1965 | Barrett et al. | 416/143 |
| 3,247,907 | 4/1966 | Mosinskis | 416/143 |
| 3,612,444 | 10/1971 | Girard | 416/143 |
| 4,208,001 | 6/1977 | Watson | 416/143 |
| 4,284,387 | 8/1981 | Ferris | 416/143 |
| 4,466,775 | 8/1984 | Martin | 416/143 |

Primary Examiner—Edward K. Look
Assistant Examiner—Michael S. Lee
Attorney, Agent, or Firm—Terrance J. Radke

[57] ABSTRACT

A pitch actuation system restraint (PASR) device that provides, inter alia, protection for the pitch actuation system of a helicopter having a main rotor assembly configured for main rotor blade folding operations. The PASR device includes permanent adapter brackets that are permanently mounted in combination with the rotor hub arms of the main rotor assembly. The PASR device further includes a temporary adapter bracket and quick release pins for each main rotor blade to be folded. Prior to implementing blade folding operations, a temporary adapter bracket is temporarily secured in combination with the pitch control horn of each main rotor blade to be folded and the permanent adapter bracket of the adjacent rotor hub arm by means of the quick release pins. Each temporary adapter bracket and permanent adapter bracket as temporarily secured in combination functions as a rigid structural interconnection between the corresponding pitch control horn and the main rotor hub assembly that effectively locks the pitch control horn in position during blade folding operations such that displacements induced in the main rotor blade during blade folding operations cannot be coupled into the pitch actuation system.

8 Claims, 6 Drawing Sheets

PITCH ACTUATION SYSTEM RESTRAINT DEVICE FOR A HELICOPTER BLADE FOLDING SYSTEM

TECHNICAL FIELD

The present invention relates to blade folding systems for helicopters, and more particularly, to a pitch actuation system restraint device for a helicopter blade folding system that precludes damage to the blade pitch actuation system during blade folding operations.

BACKGROUND OF THE INVENTION

While the flight capabilities of helicopters makes them effective vehicles for a wide variety of flight missions, the utility of helicopters in certain circumstances may be limited by the overall structural envelopes thereof. To provide the power required to support the flight capabilities of helicopters, the main rotor assemblies of helicopters incorporate a plurality of main rotor blades having large radial dimensions. The large radial dimensions of helicopter rotor assemblies results in helicopters having large structural envelopes that occupy an inordinate amount of space. The large structural envelopes of helicopters may limit their utility in some circumstances.

For example, helicopters utilized for maritime flight operations may be required to conduct operations from ships for extended periods of time. Shipboard space is generally at a premium, and the large structural envelopes of helicopters means that stowage of helicopters during periods of non-use requires a large allocation of such limited space. The same concern arises for helicopters operating from oceanic oil rigs wherein helicopters are stowed during periods of non-use. In addition to space limitations arising from the structural envelopes of helicopters due to the main rotor assemblies, the main rotor assemblies of stowed helicopters that are exposed to the environment are vulnerable to wind gusts. Furthermore, strategic and tactical considerations in the military utilization of helicopters has led to a requirement for helicopters having main rotor assemblies that may be readily reconfigured for rapid deployment, routine transport, and/or stowage through reduction in the structural envelopes of the helicopters.

Several options are available to reduce the structural envelopes of helicopters to facilitate rapid deployment, routine transport, stowage, and/or to reduce the vulnerability thereof to environmental conditions. One option is to design the main rotor assemblies of helicopters so that the main rotor blades may be removed from the rotor hub assembly. While this is a viable solution in some circumstances, it should be appreciated that such main rotor blade assemblies may be unnecessarily complex. In addition, it should be appreciated that removal of the main rotor blades tends to be time consuming and labor intensive. Moreover, these same time constraints and labor requirements exist when the helicopter is reconfigured for subsequent flight operations. Therefore, reduction of the structural envelope of helicopters by removal of the main rotor blades may not be the most viable option under some circumstances.

Another option available to reduce the structural envelopes of helicopters is to design the main rotor assemblies thereof so that the main rotor blades may be folded about the main rotor hub assembly. Main rotor blade folding operations may be implemented either automatically via hydraulic systems or manually. Automatically controlled blade folding operations require relatively extensive modifications to the main rotor assembly to incorporate the necessary mechanical apparatus to effectuate automatic blade folding. In addition, specialized software must be incorporated in the automatic flight control system to regulate automatic blade folding operations. Representative examples of such mechanical apparatus and specialized software are illustrated in U.S. Pat. Nos. 4,354,234, 4,284,387, and 3,743,441. Such mechanical apparatus unnecessarily increase the complexity of the main rotor assembly. In addition, such mechanical apparatus and software increases the overall system cost of the helicopter.

Manual blade folding operations, in contrast, generally require minimal mechanical modifications to the main rotor assembly, and do not generally require specialized software. In light of the minimal mechanical modifications required to incorporate blade folding capabilities in helicopter main rotor assemblies, this option represents a viable approach in a number of circumstances. For example, for maritime operations and oil rig use, manual blade folding operations may be effected with minimal manpower in a short period of time to reduce the overall structural envelope of helicopters. The modifications to the main rotor assembly required to accommodate manual blade folding operations result in only an incremental increase in the complexity of the main rotor assembly and the overall systems costs of the helicopter.

However, manual blade folding operations do pose a concern in terms of the pitch actuation system of the helicopter. The helicopter pitch actuation system is a relatively complex hydromechanical system comprised of a large number of precisely aligned, structurally and functionally interrelated components. Such components include the pilot's input (collective; cyclic), interconnecting mechanical linkages, hydraulic servo systems, a swashplate assembly (stationary; rotating), pitch control rods, and pitch control horns. It goes without saying that proper operation of the pitch actuation system is vital to safe and efficient helicopter flight operations. Proper operation of the pitch actuation system, in turn, requires precise alignment and functional interactions among the various elements of the hydromechanical system. Pilot inputs via the collective and cyclic controls must be accurately and systematically converted to repeatable pitch inputs to the main rotor blades via the pitch actuation system.

During blade folding operations, however, displacements may be induced into the main rotor blades being folded by wind gusts, loss of physical blade control, etc. Such displacements may be coupled into the pitch actuation system by means of the respective pitch control horns. Such coupled displacements may damage or degrade the pitch actuation system by disrupting the precise alignment and/or functional interactions among the various components of the hydromechanical pitch actuation system, thereby negatively impacting the accuracy and repeatability of the pitch actuation system. Increasing the concern vis-a-vis damage or degradation of the flight actuation system is the fact that such damage or degradation may occur to components of the hydromechanical system that are located within the helicopter fuselage, and as such, not readily visible during preflight checks prior to commencing flight operations.

Therefore, a need exists to protect the pitch actuation system of a helicopter during manual blade folding operations. The protective apparatus should preclude main rotor blade displacements incurred during blade folding operations from being coupled into the helicopter pitch actuation system. The protective apparatus should be simple in design and readily fabricated so as to not significantly increase the overall complexity of the main rotor assembly or the overall systems costs of the helicopter. The protective apparatus should also be easy to install and remove, and installation/removal should not effect the precise alignment and/or functional interaction among the hydromechanical components of the pitch actuation system.

SUMMARY OF THE INVENTION

One object of the present invention is to provide a pitch actuation system restraint device for a helicopter blade folding system that precludes damage to and/or misalignment of components of the blade pitch actuation system during helicopter blade folding operations.

Another object of the present invention is to provide a pitch actuation system restraint device that precludes main rotor blades displacements incurred during blade folding operations from being coupled into the pitch actuation system of helicopters.

These and other objects are provided by a pitch actuation system restraint (PASR) device according to the present invention that is operative to provide a rigid structural interconnection between corresponding pitch control horns and the main rotor hub assembly. The rigid structural interconnection provided by the PASR device effectively locks the respective pitch control horn in position during blade folding operations. The rigid structural interconnection provided by the PASR device precludes displacements induced in main rotor blades during blade folding operations from being coupled into the pitch actuation system.

The PASR device according to the present invention includes permanent adapter brackets that are permanently mounted in combination with the rotor hub arms of the main rotor hub assembly. The PASR device further includes temporary adapter brackets and quick release pins. Prior to commencing blade folding operations, the temporary adapter brackets are temporarily secured in combination with the pitch control horns of each main rotor blade to be folded and a corresponding permanent adapter bracket of the adjacent rotor hub arm by means of the quick release pins. Each temporary adapter bracket, permanent adapter bracket combination functions as the rigid structural interconnection between the pitch control horn of the main rotor blade to be folded and the main rotor hub assembly.

BRIEF DESCRIPTION OF THE DRAWINGS

A more complete understanding of the present invention and the attendant features and advantages thereof may be had by reference to the following detailed description when considered in conjunction with the accompanying drawings wherein.

DETAILED DESCRIPTION OF THE PREFERRED EMBODIMENT

A pitch actuation system restraint (PASR) device according to the present invention is operative to protect the pitch actuation system of a helicopter during blade folding operations by precluding displacements induced into main rotor blades undergoing folding, e.g., by wind gusts, lost of physical control of the rotor blade, or such, from being coupled into the pitch actuation system and causing damage thereto. The PASR device described in the following paragraphs has been design optimized for use in combination with the modified main rotor assembly of the C model of the S-76 ® helicopter (S-76 is a registered trademark of the Sikorsky Aircraft Division of United Technologies Corporation). The main rotor assembly of the S-76 ® helicopter is an articulated main rotor hub system. The pitch actuation system of the S-76 ® helicopter is a hydromechanical system, which includes pilot input devices (collective; cyclic), interfacing mechanical linkages, hydraulic servo cylinders, a swashplate assembly (rotating and stationary swashplates), pitch control rods, and pitch control horns, that is operative to provide pitch inputs to the rotor blades.

Figure 1:
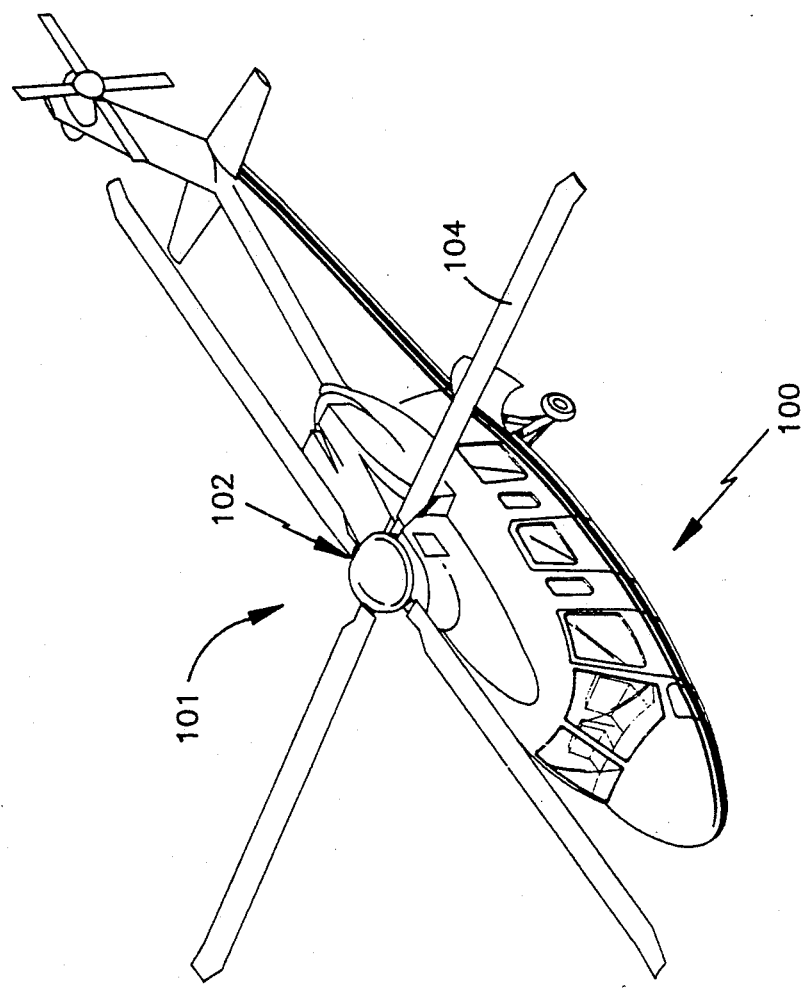
FIG. 1 is a perspective view of an S-76 ® helicopter.

With reference to FIG. 1, the S-76 ® helicopter 100 has a main rotor assembly 101 comprising a main rotor hub assembly 102 having four main rotor blades 104. As described hereinbelow in further detail, the main rotor assembly 101 of the S-76 ® helicopter 100 has been reconfigured so that two of the main rotor blades 104 may be folded utilizing a manual blade folding procedure that rearranges the main rotor assembly 101 into a stowage configuration (see FIG. 6). PASR devices according to the present invention are utilized for the main rotor blades 104 that are subjected to the manual blade folding procedure. While the PASR device of the present invention is described hereinbelow in terms of the particular structural features of the main rotor assembly 101 of the S-76 ® helicopter, one skilled in the art will appreciate that the PASR device according to the present invention may be modified for use with the main rotor assemblies of other helicopters.

Figure 2:
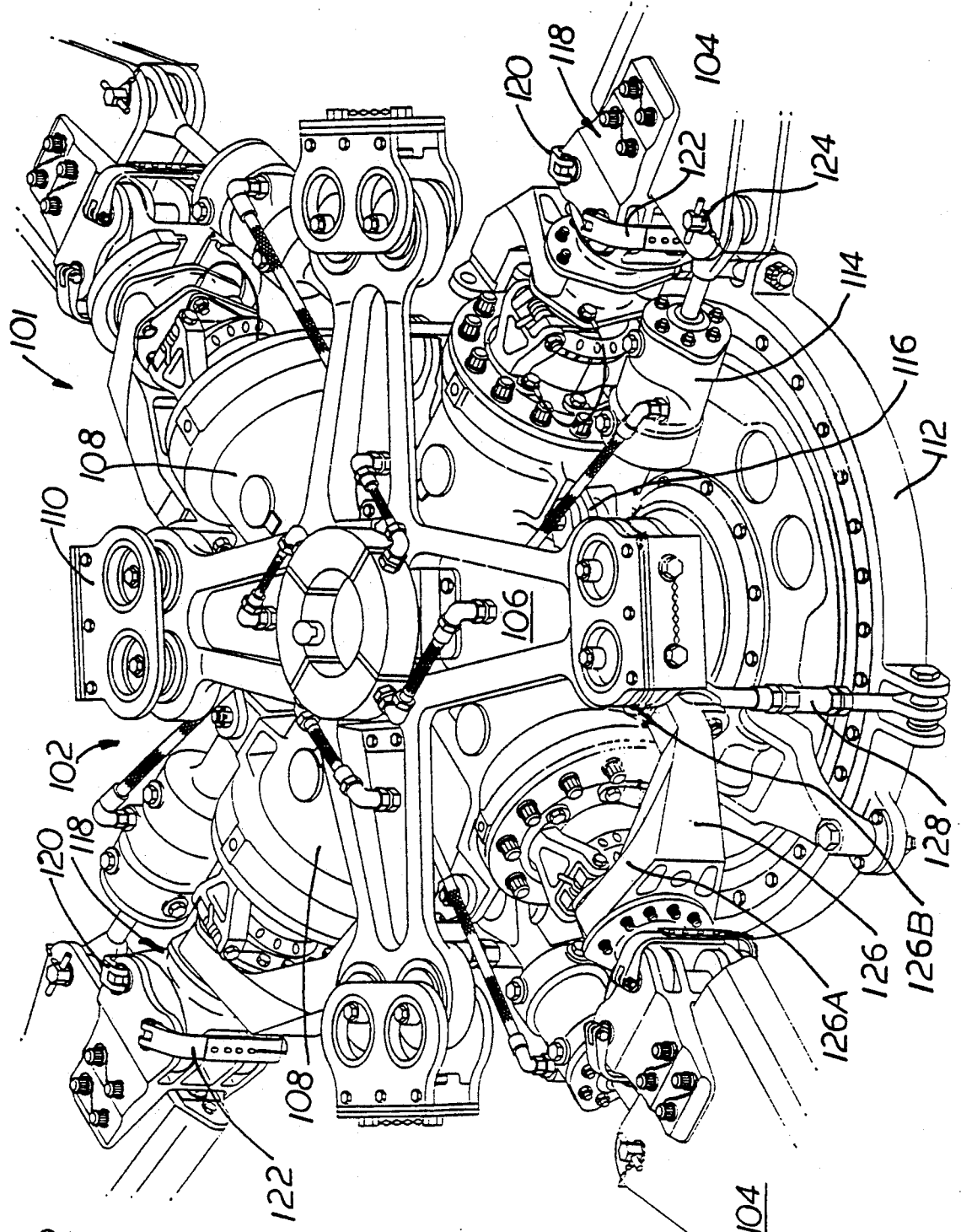
FIG. 2 is a partial perspective view of the main rotor assembly of the S-76 ® helicopter of FIG. 1.

A more detailed view of the S-76 ® main rotor assembly 101, and in particular, the main rotor hub assembly 102, is illustrated in FIG. 2 and includes a rotor hub 106 having four arms 108. The rotor hub assembly 102 further includes a bifilar vibration absorber 110 and a rotating swashplate 112. Each rotor hub arm 108 includes a damper 114 having one end secured thereto by a pair of damper lugs 116 (see also FIGS. 3, 4) incorporated as part of the rotor hub arm 108. Each pair of damper lugs 116 of the modified S-76 ® main rotor hub assembly 102 is configured to accommodate installation of the PASR device, as described in further detail hereinbelow.

Each main rotor blade 104 is mounted in combination with the corresponding rotor hub arm 108 by means of a two-member spindle 118, one member being secured to the main rotor blade 104 and the other member being secured to the rotor hub arm 108. The individual spindle members are mechanically secured in combination by first and second quick release pins 120, 122 to form the two-member spindle 118. The two-member spindle 118 is a redesigned spindle that replaces the single-piece basic S-76 ® spindle and is operative to accommodate manual blade folding by allowing the corresponding main rotor blade 104 to be rotated about an axis defined by the spindle 118, as discussed in further detail hereinbelow. The corresponding damper 114 for the main rotor blade 104 is mechanically secured in combination therewith by means of an attachment pin 124.

Each rotor hub arm 108 further includes a pitch control horn 126 having one end 126A thereof mechanically secured to the corresponding spindle 118 and the other end 126B thereof mechanically secured to a pitch control rod 128. The end 126B of each pitch control horn 126 is configured to include a mounting lug 126L having an attachment aperture 126X to accommodate installation of the PASR device, as described in further detail hereinbelow. Each pitch control rod 128 is mechanically secured in combination with the swashplate 112. The pitch control horns 126, the pitch control rods 128, and the swashplate 112 comprise elements of the pitch actuation system that are operative in combination to provide pitch inputs to the respective rotor blades 104.

Figure 3:
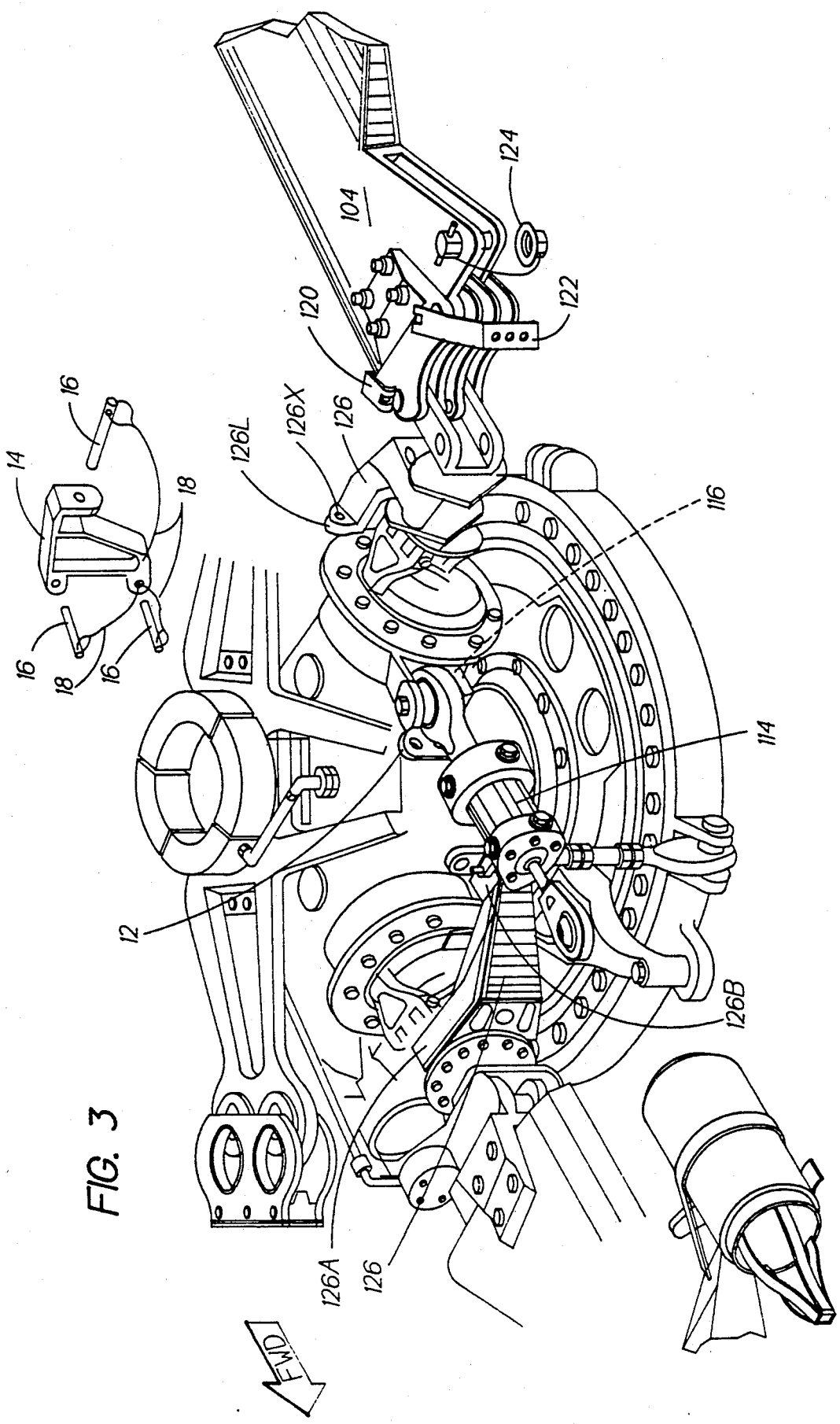
FIG. 3 is a partial exploded view illustrating the structural interrelationship between the main rotor assembly of FIG. 2 and a pitch actuation system restraint (PASR) device according to the present invention.
Figure 4:
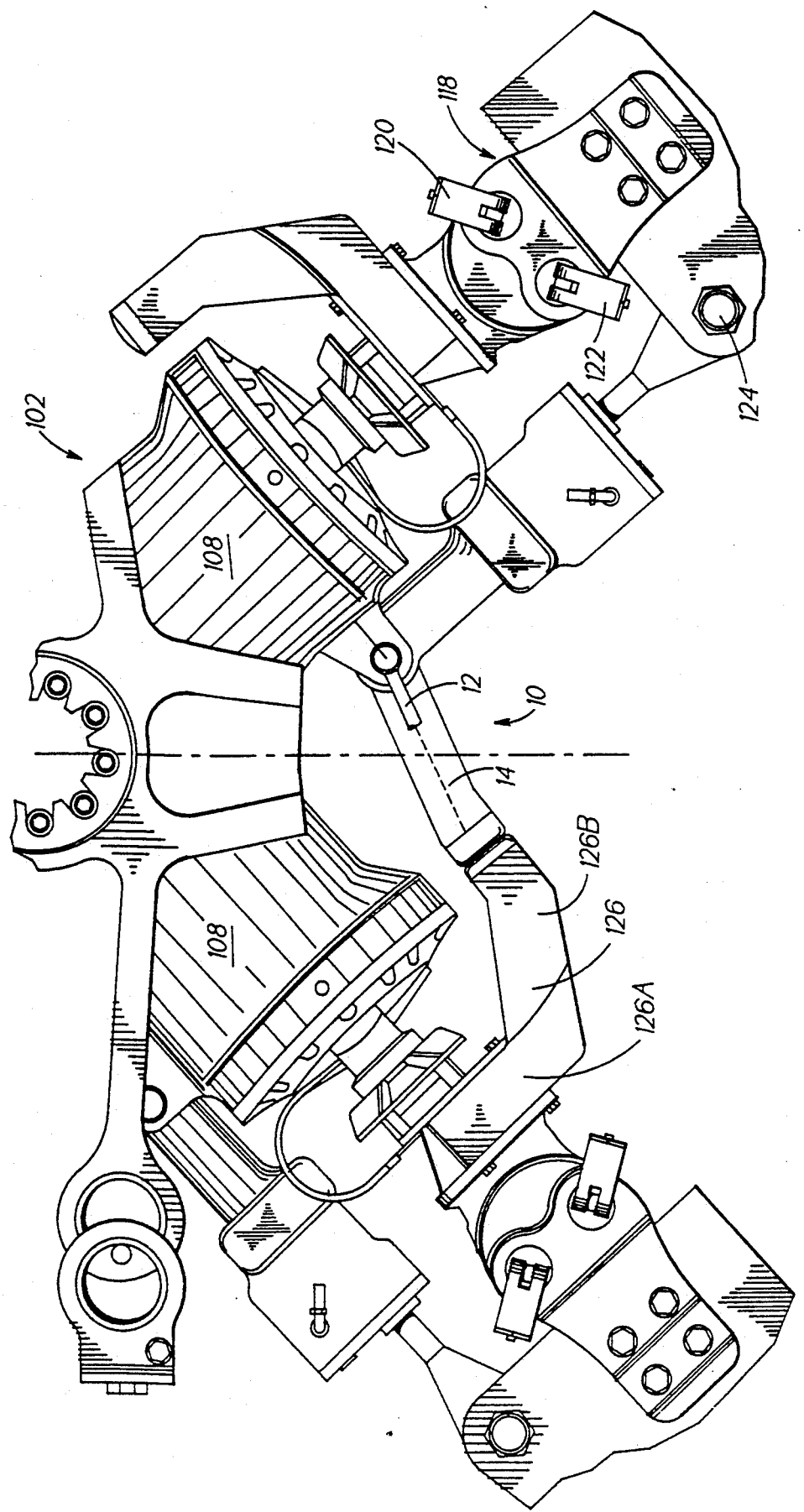
FIG. 4 is a partial top plan view of the main rotor assembly of FIG. 2 with the PASR device installed.

A pitch actuation system restraint (PASR) device 10 according to the present invention is illustrated generally in FIGS. 3, 4 and in further detail in FIGS. 5A–5D. The PASR device 10 is operative to protect the components of the pitch actuation system from damage due to displacements induced in the main rotor blades 104 during blade folding operations by locking the respective pitch control horns 126 in position, thereby precluding such displacements from being coupled into the pitch actuation system. The components comprising the PASR device 10 are small, inexpensive, easily manufactured, and readily installed in combination with the main rotor hub assembly 102. Moreover, the PASR device 10 may be readily retrofitted to existing helicopter main rotor assemblies, such assemblies requiring minimal modifications to accommodate installation of the PASR device 10 according to the present invention. An additional advantage of the PASR device 10 according to the present invention is that no elements of the pitch actuation system need be disconnected to facilitate blade folding operations.

The PASR device 10 according to the present invention comprises a permanent adapter bracket 12, a temporary adapter bracket 14, and three quick release pins 16. Each permanent adapter bracket 12 is configured to be permanently installed in combination with one rotor hub arm 108 by means of a corresponding pair of damper lugs 116. As installed, the permanent adapter brackets 12 comprise integral elements of the main rotor hub assembly 102.

Temporary adapter brackets 14, in contrast, are only installed when the main rotor assembly 101 will be subjected to the manual blade folding operation. The temporary adapter bracket 14 is configured to be temporarily installed in combination with the permanent adapter bracket 12 utilizing two quick release pins 16. The temporary adapter bracket 14 is further configured to be temporarily installed in combination with the pitch change horn 126 (the lug 126L thereof on the end 126B) utilizing the remaining quick release pin 16. The permanent and temporary adapter brackets 12, 14, secured in combination by means of the quick release pins 16, form a rigid structural interconnection between the pitch change horn 126 and the adjacent rotor hub arm 108 that locks the pitch change horn 126 in position. Thus, displacements induced in the respective main rotor blade 104 during the manual blade folding operation cannot be coupled through the pitch change horn 126, i.e., into the pitch control rod 128 and/or swashplate 112 or other elements comprising the pitch actuation system. The PASR device 10 according to the present invention, therefore, effectively isolates the pitch actuation system of the helicopter 100 from any displacements induced in the corresponding main rotor blade 104 during the manual blade folding operation.

Figure 5A:
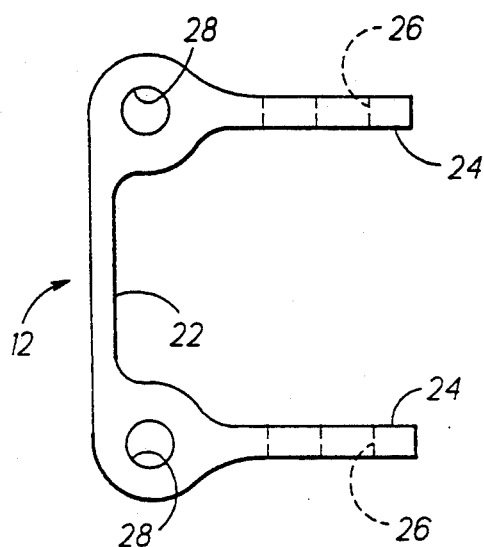
FIG. 5A is a side plan view of a permanent adapter bracket of the PASR device of FIGS. 3, 4.
Figure 5B:
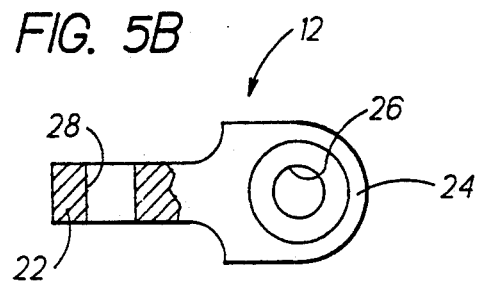
FIG. 5B is top plan view of the permanent adapter bracket of FIG. 5A.

With reference to FIGS. 5A, 5B, the permanent adapter bracket 12, which has a generally U-shaped configuration, comprises a central body member 22 and upper and lower outwardly extending lugs 24. Each lug 24 has a securing aperture 26 formed therethrough. The lugs 24 and securing apertures 26 thereof are dimensioned so that the permanent adapter bracket 12 can be mechanically secured in permanent combination with one pair of damper lugs 116 of the main rotor hub 106. The central body member 22 has upper and lower attachment apertures 28 formed therethrough. The central body member 22 and attachment apertures 28 thereof are dimensioned for mechanical attachment in temporary combination with the temporary adapter bracket 14 utilizing the quick release pins 16. The permanent adapter bracket 12 may be fabricated by any conventional manufacturing technique, and may be fabricated from any high strength, rigid material such as stainless steel.

Figure 5C:
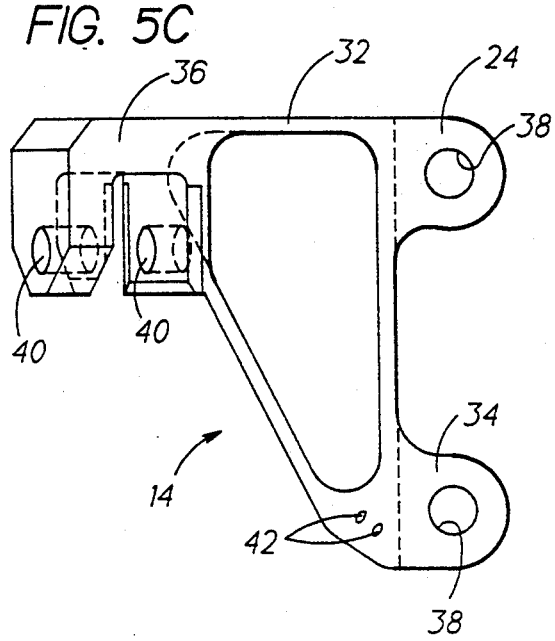
FIG. 5C is a side plan view of a temporary adapter bracket of the PASR device of FIGS. 3, 4.
Figure 5D:
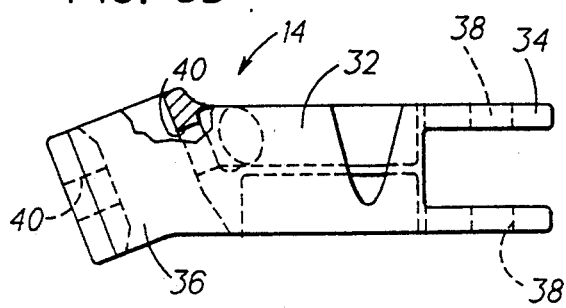
FIG. 5D is a top plan view of the temporary adapter bracket of FIG. 5C.

With reference to FIGS. 5C, 5D, the temporary adapter bracket 14, which has a generally V-shaped configuration, comprises a central body member 32, upper and lower outwardly extending clevis segments 34, and an outwardly extending, canted clevis segment 36. The arms defining the upper and lower clevis segments 34 have attachment apertures 38 formed therethrough. The upper and lower clevis segments 34 and attachment apertures 38 thereof are dimensioned for mechanical attachment in temporary combination with the permanent adapter bracket 12 utilizing the quick release pins 16. The arms defining the canted clevis segment 36 have attachment apertures 40 formed therethrough. The canted clevis segment 36 is canted (for the described embodiment, a cant angle of about 66° with respect to the edge plane of the central body member 32) and dimensioned to accommodate insertion of the pitch control horn lug 126L between the arms thereof for mechanical attachment in temporary combination therewith utilizing the quick release pin 16. The temporary adapter bracket 14 may be fabricated by any conventional manufacturing technique, and may be fabricated from any high strength, rigid material such as stainless steel.

With reference to FIG. 3, the three quick release pins 16 are operative to mechanically secure the temporary adapter bracket 14 in combination with the respective permanent adapter bracket 12 and pitch control horn 126. The pins 16 are identically dimensioned for commonality. Each pin 16 may include a lanyard 18 for securing the quick release pins 16 in combination with the temporary adapter bracket 14 utilizing orifices 42 (only two are illustrated in FIG. 5C) to facilitate the installation procedure, i.e., by insuring that the quick release pins 16 are readily available during the installation procedure.

Figure 6:
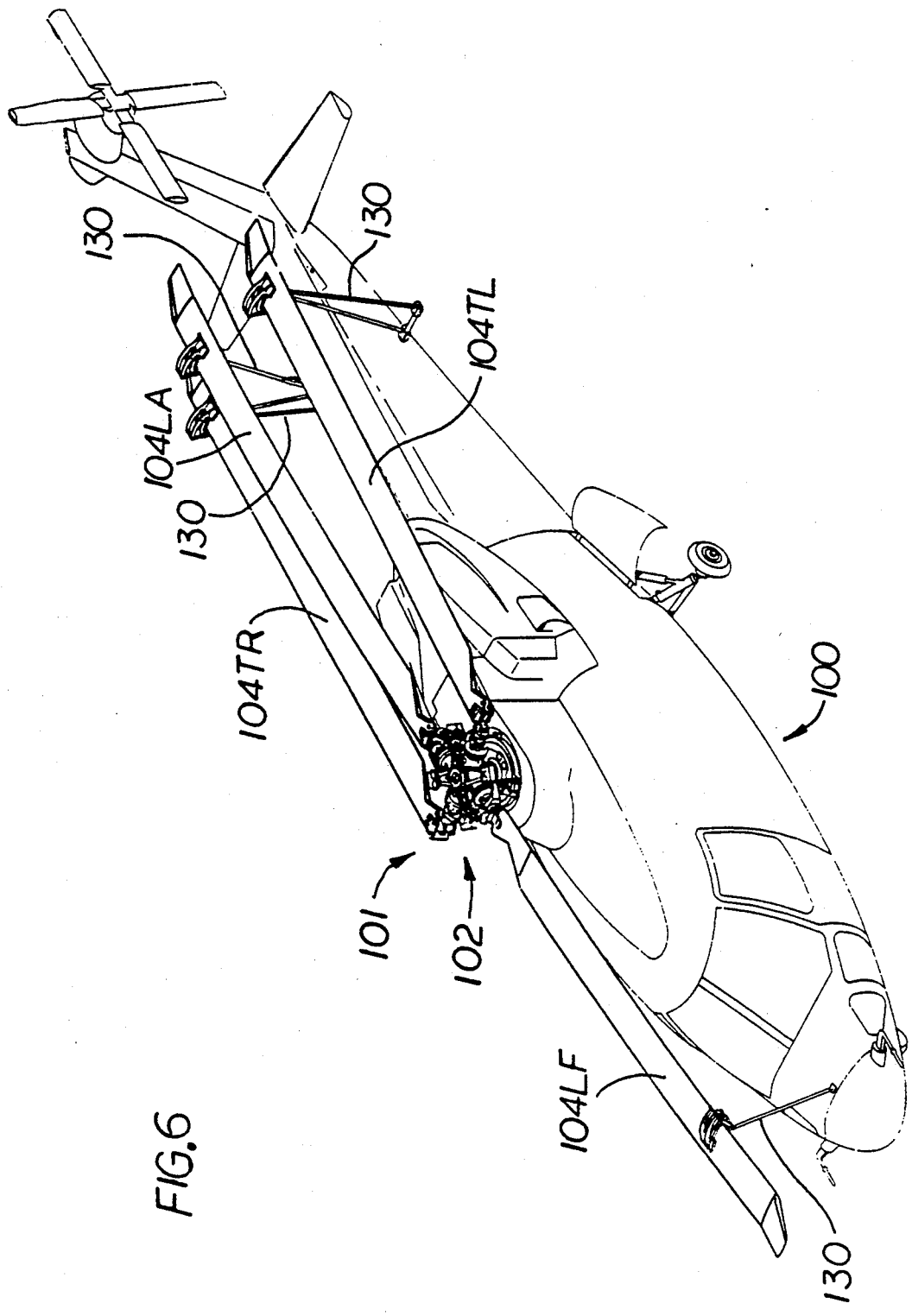
FIG. 6 illustrates the stowage configuration of the main rotor assembly of the S-76 ® helicopter after a manual blade folding operation.

To initiate the manual blade folding operation for the S-76® helicopter 100, the main rotor assembly 101 is indexed so that one pair of opposed main rotor blades 104 is substantially aligned with the longitudinal axis of the helicopter 100 (see FIGS. 1, 6). This results in the other pair of opposed main rotor blades 104 extending transversely with respect to the longitudinal axis of the helicopter 100. The transversely extending main rotor blades 104 are the only rotor blades subjected to the manual blade folding operation in the S-76® helicopter 100.

The pitch control horn 126 of each transversely extending blade 104 is locked in position by means of the PASR device 10 described hereinabove to preclude any displacements induced in the main rotor blade 104 being folded from being coupled into the pitch actuation system of the helicopter 100. As disclosed hereinabove, permanent adapter brackets 12 are mechanically secured to each of the rotor hub arms 108. A temporary adapter bracket 14 is installed in temporary combination with the permanent adapter bracket 12 secured in combination with the "adjacent" rotor hub arm 108 (with reference to FIG. 6, the permanent adapter bracket 12 of the rotor hub arm 108 of the aft longitudinally orientated main rotor blade 104LA is adjacent the left transversely orientated main rotor blade 104TL and the permanent adapter bracket 12 of the rotor hub arm 108 of the forward longitudinally orientated main rotor blade 104LF is adjacent the right transversely orientated main rotor blade 104TR). Each combination is effected by inserting the clevis segments 34 of the temporary adapter bracket 14 onto the central body member 22 of the associated permanent adapter bracket 12 so that the respective attachment apertures 38, 28 are aligned, and locking the combination in place by means of quick release pins 16 inserted through the aligned attachment apertures 28, 38. Each temporary adapter bracket 14 is then installed in temporary combination with the pitch control horn 126 of the respective transversely orientated main rotor blade 104 by inserting the canted clevis segment 36 of the temporary adapter bracket 14 onto the respective pitch control horn lug 126L, and locking the combination in place by means of the quick release pin 16 inserted through the aligned attachment apertures 40, 126X.

Once the PASR devices 10 have been installed as described in the preceding paragraph, the manual blade folding operation may be implemented. The attachment pins 124 are removed to disengage the corresponding dampers 114 from the transversely orientated main rotor blades 104TL, 104TR. Next, the second quick release pins 122 are removed from the two-member spindles 118 of the main rotor blades 104TL, 104TR. Removal of the second quick release pins 122 allows the main rotor blades 104TL, 104TR to rotated about the axis defined by the first quick release pins 120 of each spindle 118. The transversely orientated main rotor blades 104TL, 104TR are manually rotated, respectively, towards the empennage structure of the helicopter 100 into the stowage configuration. Clamping means 130 are attached to the tip segments of the rotor blades 104TL, 104TR, 104LF, 104LA and the fuselage of the helicopter 100 to immobilize the rotor blades 104 in the stowage configuration.

In the stowage configuration, the overall structural envelope of the helicopter is significantly reduced. In addition, the main rotor blades, particularly the folded main rotor blades, are less vulnerable to the effects of winds. To prepare the helicopter 100 for subsequent flight operations, the above-described procedure is accomplished step-by-step in the reverse order to unfold the main rotor blades 104TL, 104TR to a flight configuration.

A Sikorsky C-model S-76® configured for manual blade folding operations as described hereinabove was subjected to manual blade folding operations in NASA's full-scale wind tunnel at the NASA Ames Research Center. Blade folding operations were conducted with wind tunnel air flows from 25 knots up to 45 knots. The helicopter was mounted on a turntable so that the azimuthal orientation of the helicopter could be varied from a point directly into the air flow to a point directly opposite the air flow so that the effects of various wind incident angles upon manual blade folding operations could be ascertained. PASR devices according to the present invention were incorporated in the main rotor assembly and operated effectively to preclude damage to the pitch actuation system during blade folding operations.

A variety of modifications and variations are possible in light of the above teachings. For example, the PASR device according to the present invention may be utilized in helicopters having main rotor assemblies with more or less rotor blades, and/or to facilitate manual folding operations for more than two rotor blades. And while the PASR device has been described hereinabove in terms of its utility in protecting the pitch actuation system during blade folding operations, one skilled in the art will appreciate that the PASR device according to the present invention may be installed in combination with unfolded rotor blades to provide protection for the pitch actuation system in other circumstances, such as unwanted rotor blade displacements due to wind gusts. It is therefore to be understood that, within the scope of the appended claims, the invention may be practiced otherwise than as specifically described herein.

What is claimed is:

1. In combination with a helicopter having a main rotor assembly and a pitch actuation system operatively associated with the main rotor assembly, the main rotor assembly including a main rotor hub assembly having a plurality of rotor hub arms, each rotor hub arm having a main rotor blade disposed in combination therewith, each rotor hub arm further including a pitch control horn operatively associated in combination with the corresponding main rotor blade, a pitch actuation system restraint device for precluding displacements induced in at least one main rotor blade from being coupled into the pitch actuation system via the operatively associated pitch control horn, comprising:

permanent adapter bracket means configured for mounting in permanent combination with at least one rotor hub arm, the at least one rotor hub arm being adjacent the rotor hub arm of the at least one main rotor blade;

temporary adapter bracket means configured for mounting in combination with the operatively associated pitch control horn of the at least one main rotor blade, said temporary adapter bracket means being further configured for mounting in combination with said permanent adapter bracket means; and means for temporarily securing said temporary adapter bracket means in combination with said permanent adapter bracket means and the operatively associated pitch control horn of the at least one main rotor blade, respectively;

said permanent adapter bracket means and said temporary adapter bracket means as temporarily secured in combination functioning as a rigid structural interconnection between the operatively associated pitch control horn of the at least one main rotor blade and the main rotor hub assembly that effectively locks the operatively associated pitch control horn in position such that displacements induced in the at least one main rotor blade are not coupled into the pitch actuation system.

2. The pitch actuation system restraint device of claim 1 wherein said permanent adapter bracket means comprises a central body member having upper and lower lugs outwardly extending therefrom, said central body member having upper and lower attachment apertures formed therethrough for temporarily securing said temporary adapter bracket means in combination therewith.

3. The pitch actuation system restraint device of claim 2 wherein each of said upper and lower lugs has a securing aperture formed therethrough for mounting said permanent adapter bracket means in permanent combination with the at least one rotor hub arm.

4. The pitch actuation system restraint device of claim 2 wherein said temporary adapter bracket means comprises a central body member having upper and lower clevis segments outwardly extending therefrom, each said upper and lower clevis segments having attachment apertures formed therethrough, said upper and lower clevis segments and said attachment apertures thereof being dimensioned for temporarily securing said temporary adapter bracket means in combination with said central body member of said permanent bracket adapter means.

5. The pitch actuation system restraint device of claim 4 wherein said temporary securing means includes two quick release pins, and wherein said permanent adapter bracket means and said temporary adapter bracket means are temporarily secured in combination by inserting said upper and lower clevis segments of said temporary adapter bracket means onto said central body member of said permanent adapter bracket means so that said attachment apertures thereof are aligned and inserting said two quick release pins through said aligned attachment apertures.

6. The pitch actuation system restraint device of claim 4 wherein said central body member of said temporary adapter bracket means has a canted clevis segment outwardly extending therefrom, said canted clevis segment having attachment apertures formed therethrough, said canted clevis segment and said attachment apertures thereof being dimensioned for temporarily securing said temporary adapter bracket means in combination with the operatively associated pitch control horn of the at least one main rotor blade.

7. The pitch actuation system restraint device of claim 1 wherein said temporary securing means comprises three quick release pins, two of said quick release pins being utilized to temporarily secure said temporary adapter bracket means in combination with said permanent adapter bracket means and said remaining quick release pin being utilized to temporarily secure said temporary adapter bracket means in combination with the operatively associated pitch control horn of the at least one main rotor blade.

8. In combination with a helicopter having a main rotor assembly configured for manual blade folding operations and a pitch actuation system operatively associated with the main rotor assembly, the main rotor assembly including a main rotor hub assembly having a plurality of rotor hub arms, each rotor hub arm having a main rotor blade disposed in combination therewith, each rotor hub arm further including a pitch control horn operatively associated with the corresponding main rotor blade, a pitch actuation system restraint device for precluding displacements induced in each main rotor blade subjected to manual blade folding operations from being coupled into the pitch actuation system via the operatively associated pitch control horn, comprising:

a permanent adapter bracket mounted in permanent combination with each rotor hub arm of the main rotor hub assembly;

a temporary adapter bracket for each main rotor blade to be subjected to manual blade folding operations, each said temporary adapter bracket being configured for mounting in combination with the operatively associated pitch control horn of one main rotor blade to be subjected to manual blade folding operations, each said temporary adapter bracket being further configured for mounting in combination with said permanent adapter bracket of the rotor hub arm adjacent the rotor hub arm of the one main rotor blade to be subjected to manual blade folding operations; and means for temporarily securing each said temporary adapter bracket in combination with said permanent adapter bracket of the rotor hub arm adjacent the rotor hub arm of the one main rotor blade to be subjected to manual blade folding operations and the operatively associated pitch control horn of the one main rotor blade to be subjected to manual blade folding operations;

each said temporary adapter bracket and each said permanent adapter bracket as temporarily secured in combination functioning as a rigid structural interconnection between the operatively associated pitch control horn of the one main rotor blade to be subjected to manual blade folding operations and the main rotor hub assembly that effectively locks the operatively associated pitch control horn in position during manual blade folding operations such that displacements induced in the one main rotor blade during manual blade folding operations are not coupled into the pitch actuation system.

* * * * *